US009655497B2

(12) United States Patent
Lindgren et al.

(10) Patent No.: US 9,655,497 B2
(45) Date of Patent: May 23, 2017

(54) DISHWASHER

(71) Applicant: Whirlpool Corporation, Benton Harbor, MI (US)

(72) Inventors: Gary M. Lindgren, Three Oaks, MI (US); Kevin B. Miller, Lawton, MI (US); Ryan K. Roth, Saint Joseph, MI (US); Logan S. Thompson, Union City, OH (US)

(73) Assignee: Whirlpool Corporation, Benton Harbor, MI (US)

( * ) Notice: Subject to any disclaimer, the term of this patent is extended or adjusted under 35 U.S.C. 154(b) by 238 days.

(21) Appl. No.: 14/504,698

(22) Filed: Oct. 2, 2014

(65) Prior Publication Data

US 2016/0095495 A1    Apr. 7, 2016

(51) Int. Cl.
*A47L 15/42* (2006.01)
*H02G 3/14* (2006.01)
*H02B 1/26* (2006.01)

(52) U.S. Cl.
CPC ....... *A47L 15/4274* (2013.01); *A47L 15/4251* (2013.01); *H02B 1/26* (2013.01); *H02G 3/14* (2013.01)

(58) Field of Classification Search
CPC ... A47L 15/4274; A47L 15/4251; H02G 3/10; H02G 3/14; H02G 3/081; H02G 3/105; H02G 3/08; H02B 1/26
USPC ..... D99/43; 174/559–563, 503, 504, 58, 61, 174/63, 64, FOR. 109; 439/367, 76.2; 361/561, 664, 673, 679.02; 206/320; 220/4.02; 134/58 D, 57 D, 56 D
See application file for complete search history.

(56) References Cited

U.S. PATENT DOCUMENTS

| | | | |
|---|---|---|---|
| 3,692,377 A | | 9/1972 | Hancock |
| 3,862,786 A | * | 1/1975 | Brezosky ............ A47L 15/4217 312/228 |
| 4,424,407 A | * | 1/1984 | Barbic ................ H01R 13/447 174/67 |
| 5,914,665 A | * | 6/1999 | Thorp .................... G08B 7/062 174/488 |
| 6,007,353 A | * | 12/1999 | Webster ............... H01R 13/447 439/142 |
| 6,028,268 A | * | 2/2000 | Stark ........................ H02B 1/50 174/67 |
| 6,806,426 B1 | * | 10/2004 | Gretz ....................... H02G 3/14 174/481 |
| 7,097,474 B1 | * | 8/2006 | Naylor ............... H01R 13/6397 174/67 |
| 7,410,372 B2 | * | 8/2008 | Johnson .................. H02G 3/14 174/66 |
| 8,476,540 B2 | * | 7/2013 | Dahl ...................... H02G 3/088 174/50 |

(Continued)

FOREIGN PATENT DOCUMENTS

JP    3464394 B2    11/2003

*Primary Examiner* — Michael Barr
*Assistant Examiner* — Kevin G Lee
(74) *Attorney, Agent, or Firm* — McGarry Bair PC

(57) ABSTRACT

A dishwasher for treating dishes according to at least one automatic cycle of operation comprises a tub at least partially defining a treating chamber, a chassis supporting the tub and defining a space below the tub a junction box located within the space. The junction box includes a base and a cover configured to receive an electrical connection for the dishwasher.

14 Claims, 7 Drawing Sheets

(56) References Cited

U.S. PATENT DOCUMENTS 8,486,202 B2 7/2013 Haltmayer et al.
2013/0003297 A1* 1/2013 Du-Henson ............ H02G 3/081
361/695

* cited by examiner

DISHWASHER

BACKGROUND OF THE INVENTION

Contemporary automatic dishwashers for use in a home typically include a junction box for connecting the mains power line from a home to the electrical connection of the dishwasher.

BRIEF DESCRIPTION OF THE INVENTION

The invention relates to an apparatus including a dishwasher for treating dishes according to at least one automatic cycle of operation, including a tub at least partially defining a treating chamber, a chassis supporting the tub and defining a space below the tub, a junction box located within the space and having a base and a cover configured to receive an electrical connection for the dishwasher coupled to an electrical mains power line, and a single fastener passing through abutting portions of the base and the cover to simultaneously mount the base and the cover to the chassis.

DESCRIPTION OF EMBODIMENTS OF THE INVENTION

Figure 1:
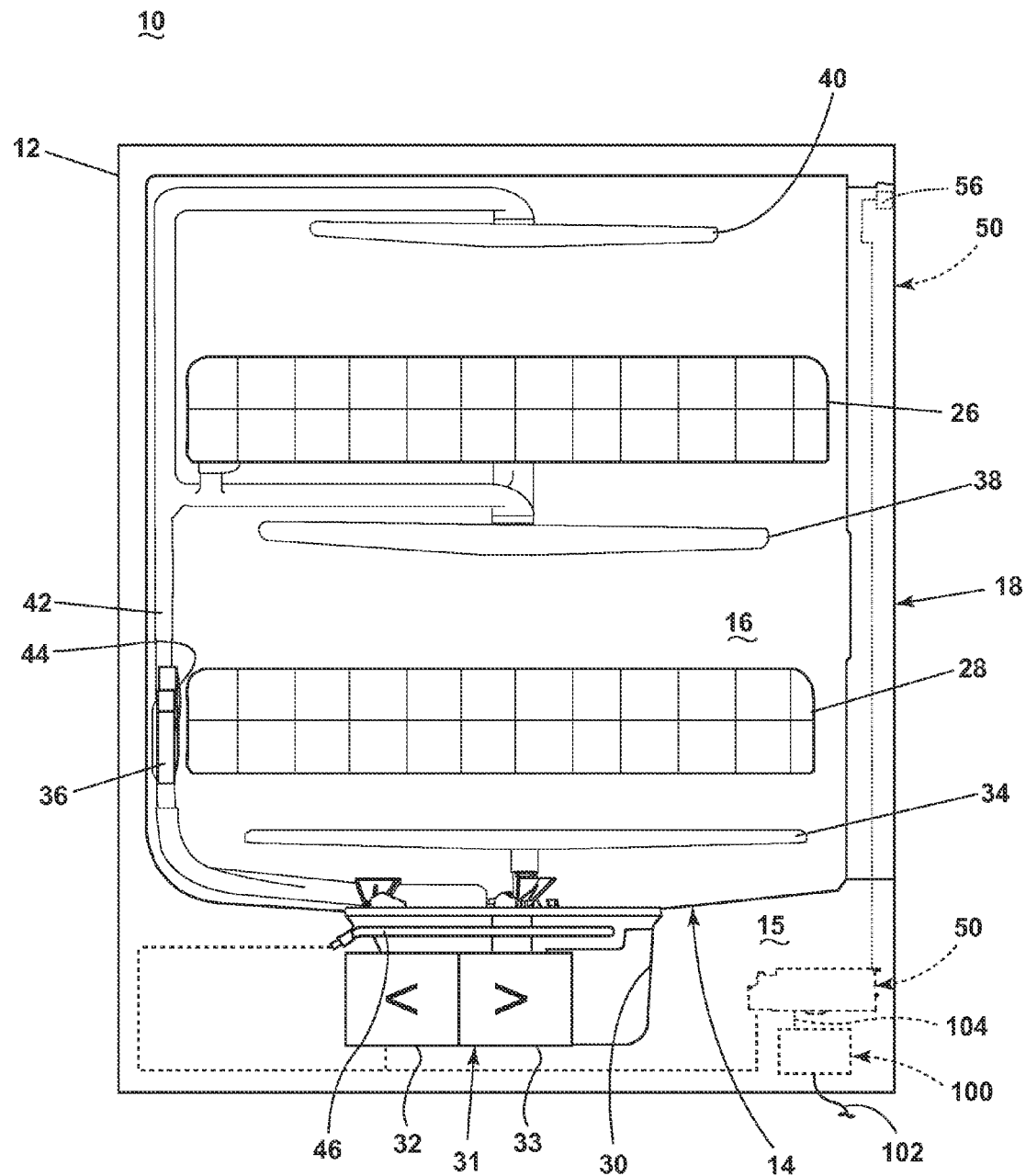
FIG. 1 is a schematic, side view of a dishwasher according to one embodiment of the invention.

In FIG. 1, an automated dishwasher 10 according to a first embodiment is illustrated. The dishwasher 10 shares many features of a conventional automated dishwasher, which will not be described in detail herein except as necessary for a complete understanding of the invention. A chassis 12 may define an interior of the dishwasher 10 and may include a frame, with or without panels mounted to the frame. An open-faced tub 14 may be provided within the chassis 12 and may be supported by the chassis 12 and may at least partially define a treating chamber 16, having an open face, for washing dishes. The chassis 12 may further define a space 15 beneath the tub 14. A door assembly 18 may be movably mounted to the dishwasher 10 for movement between opened and closed positions to selectively open and close the open face of the tub 14. Thus, the door assembly 18 provides accessibility to the treating chamber 16 for the loading and unloading of dishes or other washable items.

It should be appreciated that the door assembly 18 may be secured to the lower front edge of the chassis 12 or to the lower front edge of the tub 14 via a hinge assembly (not shown) configured to pivot the door assembly 18. When the door assembly 18 is closed, user access to the treating chamber 16 may be prevented, whereas user access to the treating chamber 16 may be permitted when the door assembly 18 is open.

Dish holders, illustrated in the form of upper and lower dish racks 26, 28, are located within the treating chamber 16 and receive dishes for washing. The upper and lower racks 26, 28 are typically mounted for slidable movement in and out of the treating chamber 16 for ease of loading and unloading. Other dish holders may be provided, such as a silverware basket. As used in this description, the term "dish(es)" is intended to be generic to any item, single or plural, that may be treated in the dishwasher 10, including, without limitation, dishes, plates, pots, bowls, pans, glassware, and silverware.

A spray system is provided for spraying liquid in the treating chamber 16 and includes sprayers provided in the form of a first lower spray assembly 34, a second lower spray assembly 36, a rotating mid-level spray arm assembly 38, and/or an upper spray arm assembly 40, which are proximate to the tub 14 to spray liquid into the treating chamber 16. Upper spray arm assembly 40, mid-level spray arm assembly 38 and lower spray assembly 34 are located, respectively, above the upper rack 26, beneath the upper rack 26, and beneath the lower rack 28 and are illustrated as rotating spray arms. The second lower spray assembly 36 is illustrated as being located adjacent the lower dish rack 28 toward the rear of the treating chamber 16. The second lower spray assembly 36 is illustrated as including a vertically oriented distribution header or spray manifold 44.

A recirculation system is provided for recirculating liquid from the treating chamber 16 to the spray system. The recirculation system may include a sump 30 and a pump assembly 31. The sump 30 collects the liquid sprayed in the treating chamber 16 and may be formed by a sloped or recessed portion of a bottom wall of the tub 14. The pump assembly 31 may include both a drain pump assembly 32 and a recirculation pump assembly 33. The drain pump assembly 32 may draw liquid from the sump 30 and pump the liquid out of the dishwasher 10 to a household drain line (not shown). The recirculation pump assembly 33 may be fluidly coupled between the treating chamber 16 and the spray system to define a circulation circuit for circulating the sprayed liquid. The circulation circuit may define a fluid flow path from the treating chamber 16 to the assemblies 34, 36, 38, 40 through which the sprayed liquid may return from the treating chamber 16 back to the assemblies 34, 36, 38, 40. More specifically, the recirculation pump assembly 33 may draw liquid from the sump 30 and the liquid may be simultaneously or selectively pumped through a supply tube 42 to each of the assemblies 34, 36, 38, 40 for selective spraying. While not shown, a liquid supply system may include a water supply conduit coupled with a household water supply for supplying water to the treating chamber 16.

A heating system including a heater 46 may be located within the sump 30 for heating the liquid contained in the sump 30.

A controller 50 may also be included in the dishwasher 10, which may be operably coupled with various components of the dishwasher 10 to implement a cycle of operation. The controller 50 may be located within the space 15 beneath the tub 14 as illustrated, or it may alternatively be located somewhere within the door 18. The controller 50 may also be operably coupled with a control panel or user interface 56 for receiving user-selected inputs and communicating information to the user. The user interface 56 may include operational controls such as dials, lights, switches, and displays enabling a user to input commands, such as a cycle of operation, to the controller 50 and receive information.

A junction box 100 may also be included in the dishwasher 10, which may be operably coupled between the controller 50 and a mains power line 102 of a house to supply power to the dishwasher 10, typically by providing power via the controller 50. The junction box 100 houses the coupling of a dishwasher electrical connection 104 connected to the controller 50 and the mains power line 102. The junction box 100 may be located within the space 15 beneath the tub 14 and may be mounted to the chassis 12. The controller 50 may be disposed above and adjacent to the junction box 100 such that the length of a dishwasher electrical connection 104 extending between the junction box 100 and controller 50 may be minimized.

Figure 2:
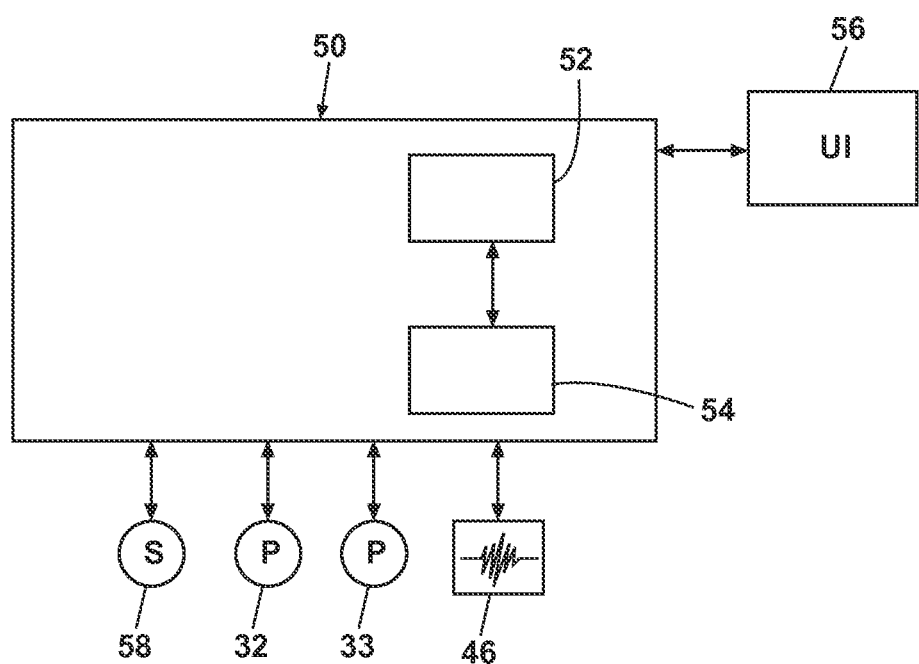
FIG. 2 is a schematic view of a controller of the dishwasher of FIG. 1.

As illustrated schematically in FIG. 2, the controller 50 may be coupled with the heater 46 for heating the wash liquid during a cycle of operation, the drain pump assembly 32 for draining liquid from the treating chamber 16, and the recirculation pump assembly 33 for recirculating the wash liquid during the cycle of operation. The controller 50 may be provided with a memory 52 and a central processing unit (CPU) 54. The memory 52 may be used for storing control software that may be executed by the CPU 54 in completing a cycle of operation using the dishwasher 10 and any additional software. For example, the memory 52 may store one or more pre-programmed cycles of operation that may be selected by a user and completed by the dishwasher 10. The controller 50 may also receive input from one or more sensors 58. Non-limiting examples of sensors that may be communicably coupled with the controller 50 include a temperature sensor and turbidity sensor to determine the soil load associated with a selected grouping of dishes, such as the dishes associated with a particular area of the treating chamber.

Figure 3A:
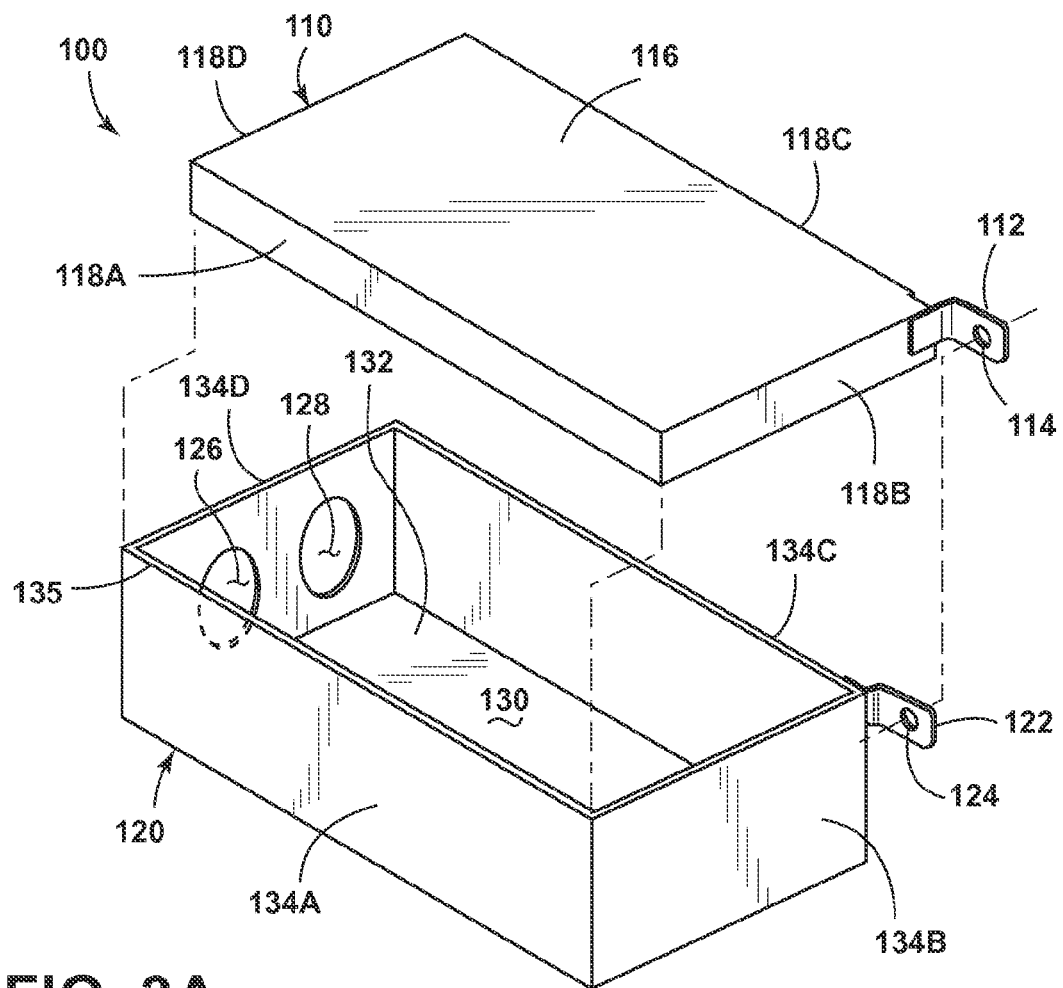
FIG. 3A is an exploded perspective view of a junction box according to an embodiment of the invention illustrating a cover spaced from a base.
Figure 3B:
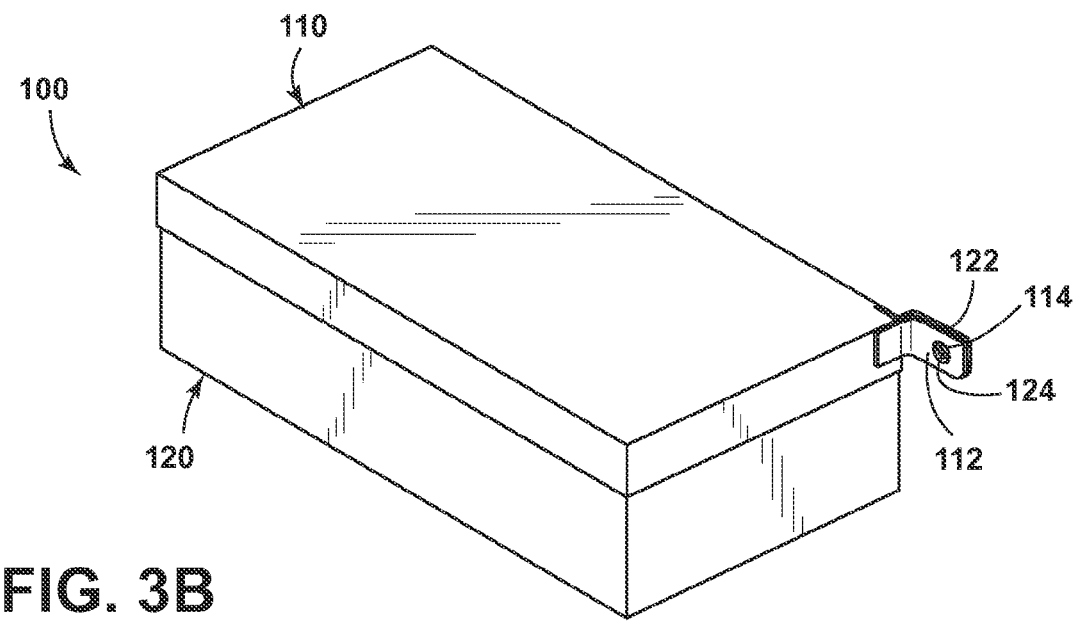
FIG. 3B is a perspective view of the junction box of FIG. 3A illustrating the cover assembled to the base.

FIG. 3A and FIG. 3B illustrate the details of the junction box 100. The junction box 100 comprises a base 120 and a cover 110. The base 120 includes a lower surface 132 and upstanding walls 134 A-D extending upwardly therefrom to define an interior compartment 130. The cover 110 includes an upper surface 116 and downwardly extending walls 118 A-D extending downwardly therefrom. The base 120 and cover 110 both include mounting tabs 122, 112 having mounting apertures 124, 114. The mounting tabs 122, 112 extend laterally outward from the upstanding and downwardly extending walls 134 C, 118 B. The base further comprises an input aperture 128 and an output aperture 126 disposed in the rear upstanding wall 134 D. It will be understood that the input and output apertures 128, 126 and the mounting tabs 122, 112 may be disposed in or extend from any of the upstanding walls 134 A-D or downwardly extending walls 118 A-D without departing from the scope of the invention.

As illustrated in FIG. 3B, the cover 110 is configured to engage the base 120 such that the interior compartment 130 is enclosed by the cover 110. When engaged, the downwardly extending walls 118 A-D are disposed outside of the upstanding walls 134 A-D such that the upper surface 116 of the cover 110 rests on an upper perimeter 135 of the base 120. The mounting tabs 122, 112 are configured to abut one another such that the mounting apertures 124, 114 coaxially align.

The junction box 100 may be mounted to the dishwasher by commonly mounting the base 120 and cover 110 to the chassis of the dishwasher by a single fastener passing through the coaxially aligned mounting apertures 124, 114 to secure the mounting tabs 122, 112 of the base 120 and cover 110 to the chassis.

In operation, the cover 110 is separated from the base 120 so as to expose the interior compartment 130. A mains power line may enter the interior compartment 130 through the input aperture 126. A dishwasher electrical connection may enter the interior compartment 130 through the output aperture 128. The mains power line may be electrically coupled to a dishwasher electrical connection in the interior compartment 130. Once the mains power line is electrically coupled to the dishwasher electrical connection, the cover 110 is placed on the base 120 so as to enclose the interior compartment 130 and align the mounting apertures 124, 114 on the mounting tabs 122, 122. The base 120 and cover 110 of the junction box 100 are then secured to the chassis of the dishwasher by a single fastener passing through the mounting apertures 124, 114 into the chassis. By removably mounting the base 120 and cover 110 to the chassis, the junction box 100 may be removed from the space beneath the dishwasher to aid in coupling the mains power line to the dishwasher electrical connection as well as to provide access to components of the dishwasher located behind the junction box. Furthermore, with limited space beneath the tub of the dishwasher, installing multiple fasteners is cumbersome and by securing the junction box 100 to the chassis of the dishwasher using a single fastener, the ease of mounting the junction box 100 is greatly increased.

Figure 4:
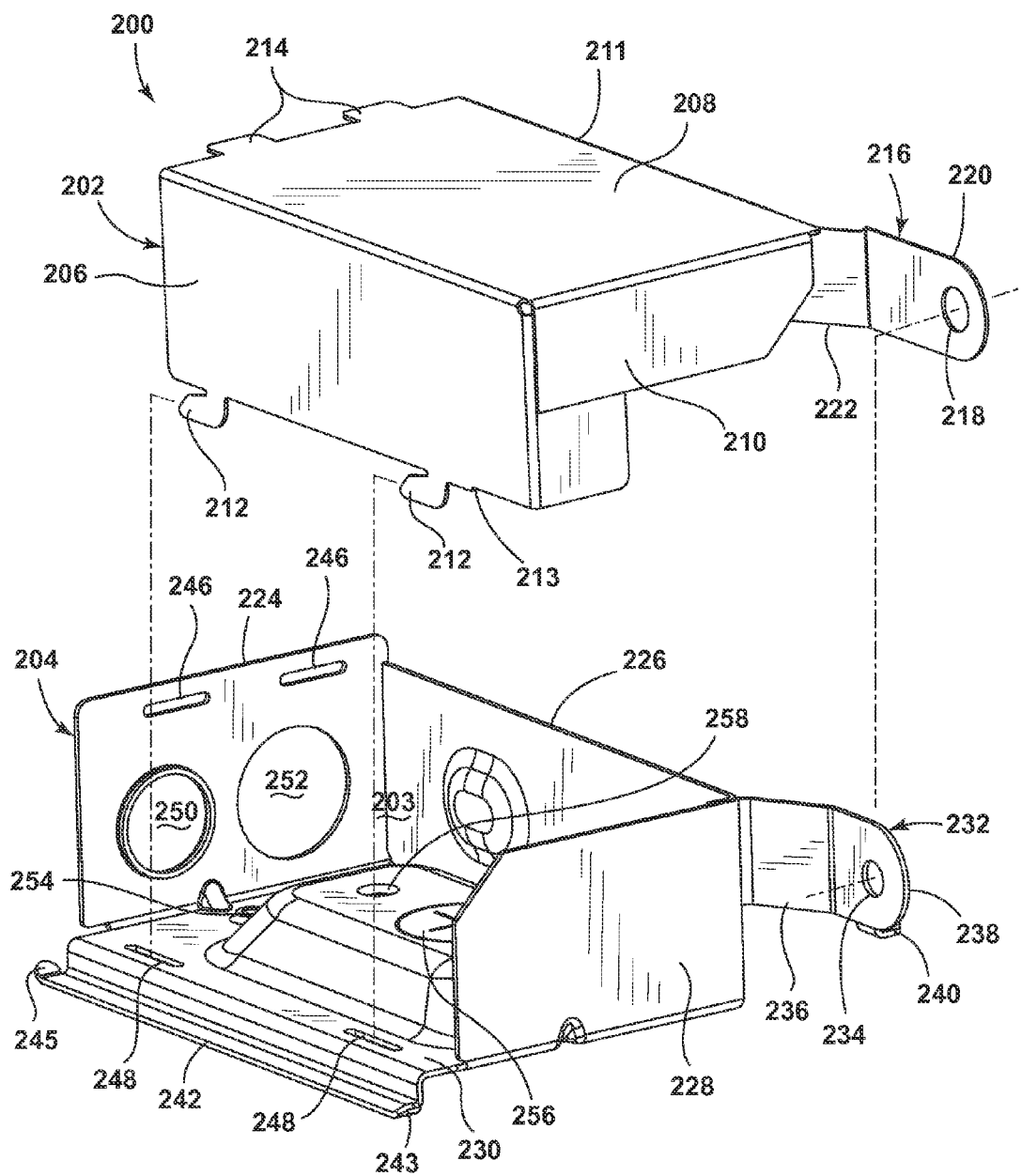
FIG. 4 is an exploded perspective view of a junction box according to another embodiment of the invention.

FIG. 4 shows an exploded view of a junction box 200 according to a second embodiment of the invention. The junction box 200 of the second embodiment is similar to the first embodiment in that the junction box 200 comprises a base 204 defining an interior compartment 203 including a first mounting tab 232 having a mounting aperture 234 and a cover 202 configured to engage the base 204 to enclose interior compartment 203 including a second mounting tab 216 having a mounting aperture 218. Furthermore, the mounting apertures 234, 218 coaxially align when the cover 202 engages the base 204 to receive a fastener to commonly mount the cover 202 and the base 204 of the junction box 200 to a chassis of a dishwasher.

The base 204 further comprises a lower surface 230 connected to a front upstanding wall 228, a rear upstanding wall 224 and a side upstanding wall 226 connected between the front and rear upstanding walls 228, 224. The first mounting tab 232 is disposed at the intersecting edge of the front and side upstanding walls 228, 226 and includes an angled portion 236 extending outwardly and away from the front and side upstanding wall 228, 226 and mounting portion 238 connected to the angled portion 236 which is parallel to the side upstanding wall 226. The mounting portion 238 is provided with the mounting aperture 234 as well as a forward positioning tab 240.

The rear upstanding wall 224 may include upper cover retaining slots 246, an input aperture 252 configured to receive a mains power line and an output aperture 250 configured to receive a dishwasher electrical connection. The lower surface 230 may include lower cover retaining slots 248 and a step down ski 242 connected to and extending below the lower surface 230. The cover retaining slots 248 may also serve as drainage apertures in the event that liquid enters the interior compartment 203. The step down ski 242 may include upwardly extending tips 243 in the front and rear of the step down ski 242. The upwardly extending tips 243 of the step down ski 242 prevent the lower surface 230 of the junction box 200 from being caught on flooring or other horizontal surfaces during removal and installation of the junction box 200 or dishwasher.

The lower surface 230 may also include a raised plateau 256 extending upwardly from the lower surface 230. The raised plateau 256 may include a ground aperture 258 configured to receive a grounding fastener to secure a grounding wire from the mains power line. The lower surface 230 may include a second ground aperture 254 configured to receive a grounding fastener from the outside to secure a grounding wire from the dishwasher 10. The lower surface 230, raised plateau 256, and cover retaining slots 248 serving as drainage apertures are configured such that if a liquid such as water enters the interior compartment 203, the liquid will drain off the raised plateau 256 onto the lower surface 230 and through the cover retaining slots 248 so as to prevent a liquid from accumulating in the interior compartment 203, and especially on the couplings of the mains power line to the dishwasher electrical connection which rest on the raised plateau 256.

The cover 202 further comprises an upper surface 208 connected to a downwardly extending side wall 206, a downwardly extending side partial wall 211 and a downwardly extending front partial wall 210 adjacently connected to both the upper surface 208 and downwardly extending side wall 206. The second mounting tab 216 is disposed at the intersecting edge of the front partial wall 210 and the side partial wall 211 and includes an angled portion 222 extending outwardly and away from the front partial wall 210 and the side partial wall 211 and mounting portion 220 connected to the angled portion 222 which is parallel to the side partial wall 211. The mounting portion 220 is provided with the mounting aperture 218.

The rear portion of the upper surface 208 may include upper retaining tabs 214 configured to be received by the upper cover retaining slots 246 in the rear wall 224 of the base 204. The lower portion of the side wall 206 may include lower retaining tabs 212 configured to be received by the lower cover retaining slots 248 in the lower surface 230 of the base 204. The lower portion of the side wall 206 may also include an engagement notch 213 formed in the side wall 206 forward of the lower retaining tabs 212. The engagement notch 213 will be described in more detail below.

It will be understood that the rear upstanding wall 224 defines the rear of the junction box 200, the front upstanding wall 228 defines the front of the junction box 200, the distance between the upper surface 208 of the cover 202 and the lower surface 230 of the base 204 defines the height of the junction box 200, and the distance between the rear and front upstanding walls 224, 228 defines the depth of the junction box 200.

Figure 5A:
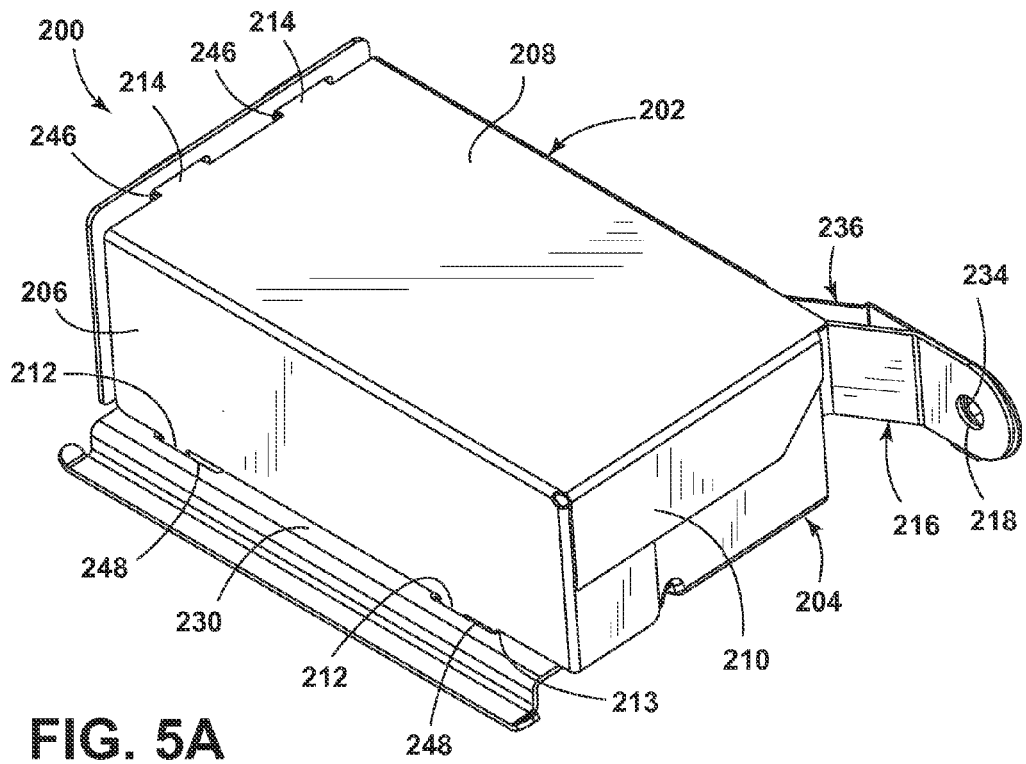
FIG. 5A is a perspective view of the junction box of FIG. 4.
Figure 5B:
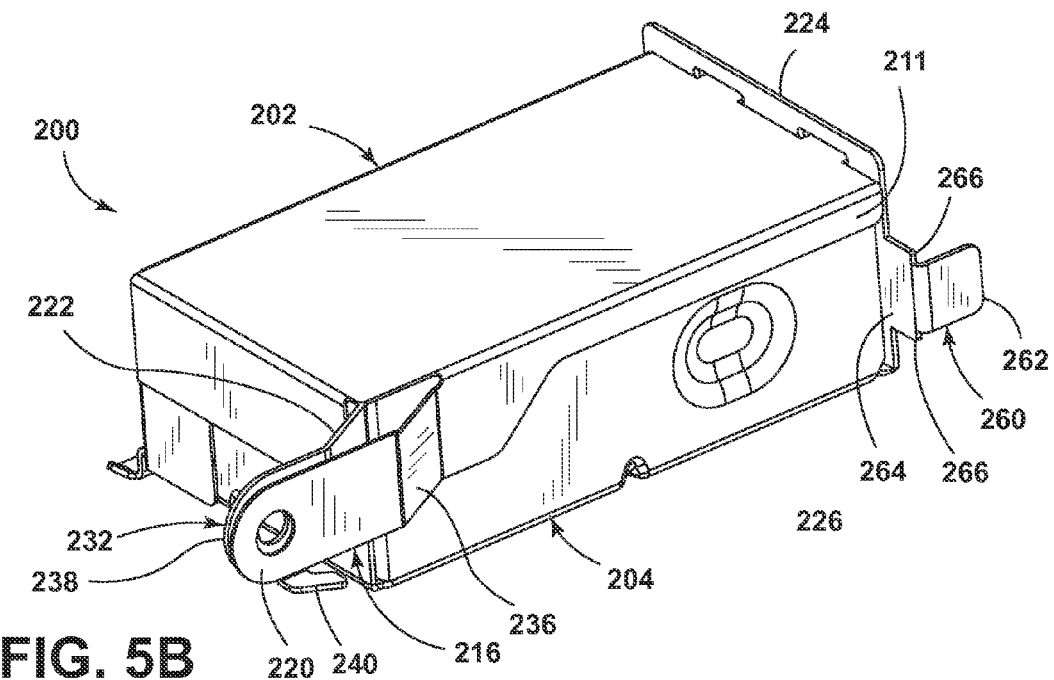
FIG. 5B is a perspective view of the junction box of FIG. 4.

As seen in FIG. 5A and FIG. 5B, the cover 202 is configured to engage the base 204 to enclose the interior compartment (FIG. 4) and coaxially align the mounting apertures 234, 218 such that the front partial wall 210 and side partial wall 211 of the cover 202 are disposed outside of the front upstanding wall 228 and side upstanding wall 226 of the base 204. When the base 204 and cover 202 are engaged, the mounting tabs 216, 232 abut one another and the mounting apertures 234, 218 coaxially align. Furthermore, the upper retaining tabs 214 and lower retaining tabs 212 of the cover 202 are received by the upper cover retaining slots 246 and lower cover retaining slots 248 in the base 204, respectively. When the cover 202 is fully engaged with the base 204, the engagement notch 213 will be received by the forward of the two lower cover retaining slots 248 such that the lower horizontal edge of the side wall 206 is flush with the lower surface 230 of the base 204.

To engage the cover 202 with the base 204, the upper retaining tabs 214 are inserted into the upper cover retaining slots 246 and the lower retaining tabs 212 are inserted into the lower cover retaining slots 248. The cover 202 is then moved rearwardly until the upper surface 208 and side wall 206 abut the rear upstanding wall 224 and the engagement notch 213 is received by the forward of the two lower cover retaining slots 248 such that the lower horizontal edge of the side wall 206 is flush with the lower surface 230 of the base 204.

As seen in FIG. 5B, the upwardly extending rear wall 224 may further include a rear positioning tab 260 having a standoff portion 264 parallel to the upwardly extending rear wall 224 and a retaining portion 262 extending traversly to the a standoff portion 264 and rearwardly of the upwardly extending rear wall 224. The standoff portion 264 is configured to position the rear retaining portion 262 away from the side upstanding wall 226 and may include standoff notches 266 disposed between the standoff portion 264 and the retaining portion 262. The retaining portion 262 is configured to be received by a corresponding slot in the dishwasher chassis (best shown in FIG. 7) and the standoff notches 266 are configured to prevent the standoff portion 264 from being received by the corresponding slot in the dishwasher chassis. The forward positioning tab 240 is also configured to be received by a corresponding slot in the dishwasher chassis (best shown in FIG. 7). The angled portions 236, 222 of the mounting tabs 216, 232 are configured such that the mounting portions 238, 220 and forward positioning tab 240 are positioned a similar distance away from the side upstanding wall 226 as the retaining portion 262 of the rear positioning tab 260.

To mount the junction box 200 to a dishwasher chassis, the retaining portion 262 of the rear positioning tab 260 is inserted into a corresponding slot in the dishwasher chassis. The front of the junction box 200 is then pivoted about the standoff notches 266 and the forward positioning tab 240 is inserted into another corresponding slot in the dishwasher chassis. A fastener is then inserted through the mounting apertures 234, 218 of the mounting tabs 232, 216 into the dishwasher chassis such that the fastener secures the mounting tabs 232, 216 against the dishwasher chassis. By providing forward and rear positioning tabs 240, 260, the junction box 200 may be positioned and retained in the mounting location prior to inserting the single fastener to secure the junction box 200 to the chassis. This allows a user to use both hands when inserting the single fastener through the mounting apertures 234, 218 into the dishwasher chassis thereby increasing the ease of installation of the junction box 200. Furthermore, the user may engage the cover 202 and base 204 prior to positioning and securing the junction box 200 which minimizes the amount of work a user performs in the space beneath the tub when installing the junction box 200.

The junction box 200 may be manufactured from a variety of materials and a variety of processes. For example, the junction box 200 may be manufactured from galvanized steel using stamping and bending processes. Other materials may include but are not limited to plastics, composites and alloys and other processes may include but are not limited to injection molding, welding, casting, and cutting.

Figure 6:
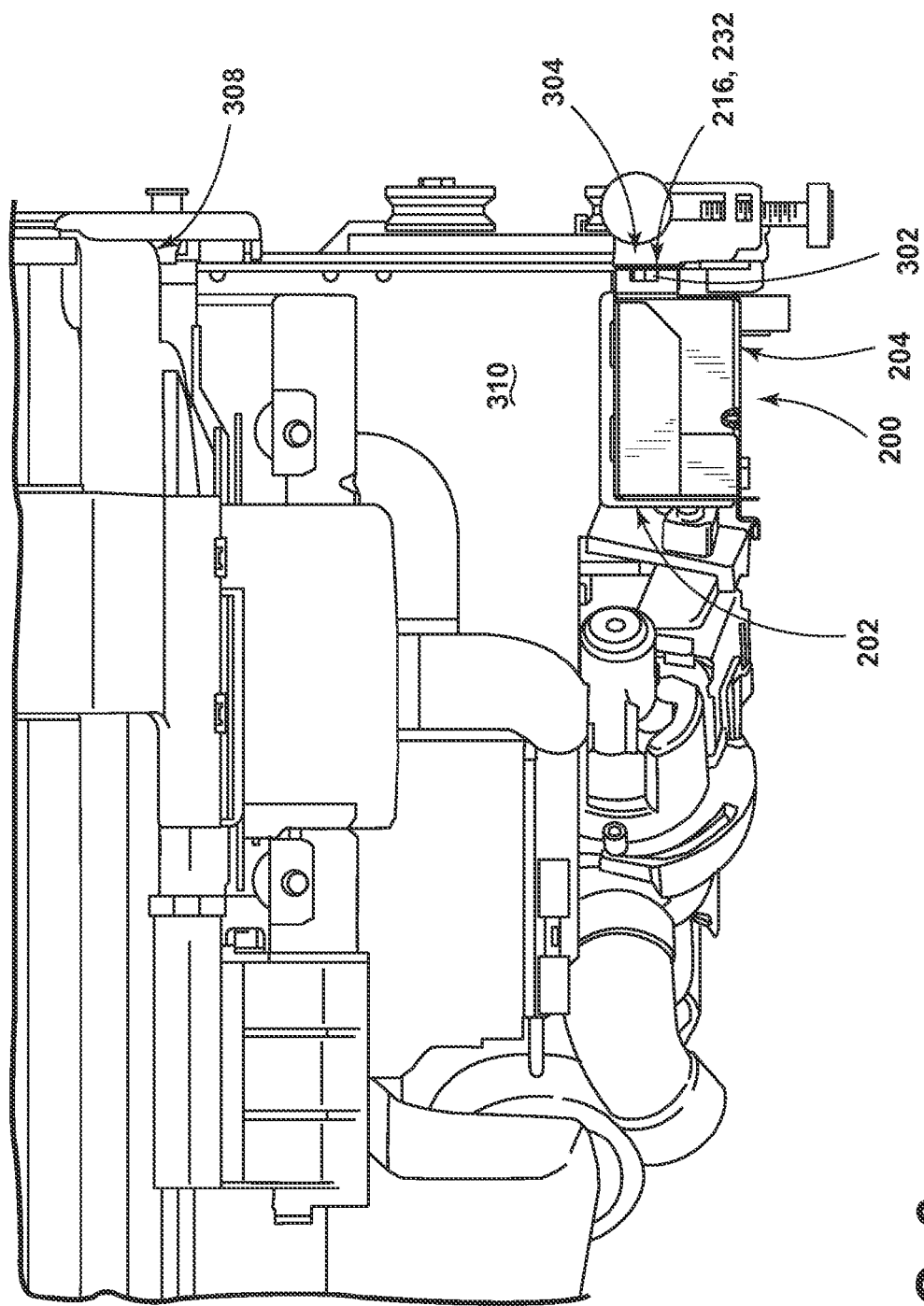
FIG. 6 is a front elevation view of the junction box of FIG. 4 mounted to a dishwasher.
Figure 7:
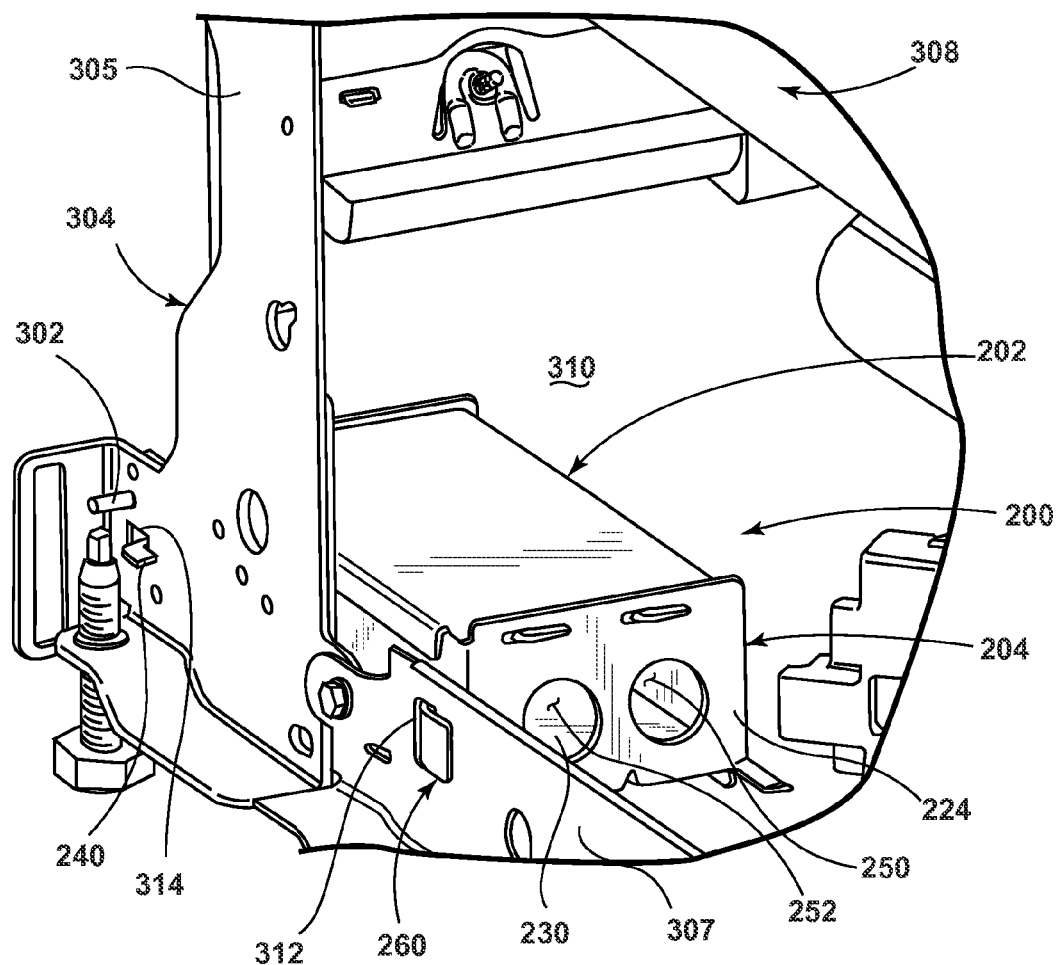
FIG. 7 is a perspective view of the junction box of FIG. 4 mounted to a dishwasher.

FIG. 6 and FIG. 7, better illustrate the junction box 200 mounted to a dishwasher chassis 304. The dishwasher chassis 304 supports a tub 308 and defines a space 310 below the tub 308. The junction box 200 is located within the space 310 beneath the tub 308 and the base 204 and cover 202 are commonly mounted to the chassis 304 to secure the junction box 200 within the space 310. The base 204 and cover 202 are commonly mounted to the chassis 304 by a fastener 302 which secures the mounting tabs 232, 216 of the base 204 and cover 202 to the chassis 304. The junction box 200 is positioned within the space 310 such that the lower surface 230 of the base 204 is horizontally oriented.

The chassis 304 may include a vertically-oriented hinge bracket 305 connected to a horizontally-oriented chassis runner 307. The hinge bracket 305 may have a forward retaining slot 314 configured to receive the forward positioning tab 240 and the chassis runner 307 may have a rear retaining slot 312 configured to receive the rear positioning tab 260 as described above. The hinge bracket 305 may also be configured to receive the fastener 302 that secures the junction box 200 to the chassis 304.

The fastener 302 may be of any type capable of selectively mounting the junction box 200 to the dishwasher chassis 304 as described herein. Examples of suitable fasteners may include but are not limited to screws, press-fit or snap-fit fasteners, spring clips and nuts and bolts.

To remove the junction box 200, the fastener 302 is removed from the chassis 304 and the forward and rear positioning tabs 240, 260 are disengaged from the forward and rear retaining slots 314, 312. Once disengaged, the junction box 200 may simply be pulled forward out of the space 310 beneath the tub 308 and the cover 202 may be separated from the base 204 to allow easy access to the interior compartment of the junction box 200 containing the coupled mains power line and dishwasher electrical connection.

The dishwasher and junction box disclosed herein provides a plurality of benefits including that the junction box may be mounted to a dishwasher chassis using a single fastener allowing for simple and intuitive installation and removal. By configuring the junction box such that the single fastener passes through both the cover and base to mount the junction box to the chassis, users are encouraged to both engage the cover and base before mounting to the chassis and to mount the junction box to the chassis after engaging the cover and base. By providing removable mounting of both the base and the cover, the junction box may be removed from the space beneath the tub to provide more working space for a user when working on the electrical connections within the junction box. Furthermore, the ability to easily remove the junction box from the space beneath the tub provides access to dishwasher components located behind the junction box, thereby increasing serviceability of the dishwasher. In the case that new flooring around the dishwasher is installed after initial installation, raising the floor level, the step down ski prevents damage to the floor when removing the dishwasher or junction box. The raised plateau and drainage aperture prevent water from accumulating in the junction box around the electrical connection disposed therein, thereby preventing damage to the dishwasher electrical system. Furthermore, on models with the controller mounted under the dishwasher tub, positioning the junction box adjacent to the dishwasher controller minimizes the length of the dishwasher electrical connection between the junction box and controller, thereby decreasing manufacturing costs and increasing serviceability.

The invention may advantageously be applied to any appliance having a junction box for connecting a mains power line to the appliance. Such appliances may include but are not limited to dishwashers, laundry treating appliances such as washing and drying machines, stoves, ovens, refrigerators, ice makers, coffee makers, microwaves, air conditioners, furnaces, water heaters and water softeners.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A dishwasher for treating dishes according to at least one automatic cycle of operation, comprising:
    a tub at least partially defining a treating chamber;
    a chassis supporting the tub and defining a space below the tub;
    a junction box located within the space and having a base and a cover configured to receive an electrical connection for the dishwasher coupled to an electrical mains power line; and
    a single fastener passing through abutting portions of the base and the cover to simultaneously mount the base and the cover to the chassis.

2. The dishwasher of claim 1 wherein the single fastener is selectively removable.

3. The dishwasher of claim 2 wherein removing the single fastener allows the junction box to be removed from within the space.

4. The dishwasher of claim 3 wherein removing the single fastener allows the cover to be separated from the base.

5. The dishwasher of claim 4 wherein the base and cover comprise mounting tabs forming abutting portions and having mounting apertures.

6. The dishwasher of claim 5 wherein the mounting tabs and the mounting apertures coaxially align.

7. The dishwasher of claim 6 wherein the single fastener passes through the coaxially aligned mounting apertures to simultaneously mount the base and cover to the chassis.

8. The dishwasher of claim 1 wherein the base comprises a lower surface and the cover comprises an upper surface parallel to the lower surface.

9. The dishwasher of claim 8 wherein the lower surface and upper surface are horizontally oriented when the base and the cover are simultaneously mounted to the chassis.

10. The dishwasher of claim 9 wherein the lower surface includes a raised plateau configured to prevent a liquid from accumulating on the raised plateau.

11. The dishwasher of claim 10 wherein the lower surface includes a drainage aperture disposed around the raised plateau.

12. The dishwasher of claim 1 wherein one of the base or cover comprises a positioning tab configured to be received by the chassis and to position the junction box within the space below the tub.

13. The dishwasher of claim 1, further comprising a controller located within the space below the tub configured to control at least one automatic cycle of operation.

14. The dishwasher of claim 13 wherein the junction box is positioned adjacent to the controller.

* * * * *